United States Patent [19]
Galvin

[11] Patent Number: 5,097,803
[45] Date of Patent: Mar. 24, 1992

[54] FUEL SUPPLY AND CONTROL SYSTEM FOR COMPRESSION IGNITION ENGINES

[75] Inventor: Mark P. Galvin, Wadestown, New Zealand

[73] Assignee: Her Majesty the Queen in right of New Zealand, Lower Hutt, New Zealand

[21] Appl. No.: 568,725

[22] Filed: Aug. 17, 1990

[30] Foreign Application Priority Data

Aug. 22, 1989 [JP] Japan ................... 1-215866

[51] Int. Cl.$^5$ .................. F02B 43/10; F02M 27/02
[52] U.S. Cl. .................. 123/3; 123/179.21; 123/1 A
[58] Field of Search .......... 123/1 A, 3, 304, 179 H, 123/431

[56] References Cited

U.S. PATENT DOCUMENTS

| | | | |
|---|---|---|---|
| 4,133,847 | 1/1979 | Feuerman | 123/3 X |
| 4,413,594 | 11/1983 | Hirota | 123/3 |
| 4,567,857 | 2/1986 | Houseman et al. | 123/3 |
| 4,876,989 | 10/1989 | Karpuk et al. | 123/3 |

FOREIGN PATENT DOCUMENTS

0022876 12/1979 European Pat. Off.
2306343 3/1976 France

*Primary Examiner*—Tony M. Argenbright
*Attorney, Agent, or Firm*—Oblon, Spivak, McClelland, Maier & Neustadt

[57] ABSTRACT

A fuel supply system for a single or multi-cylinder internal combustion engine (1) of the compression ignition kind (e.g. a diesel engine) and including a liquid fuel injection pump (2) for injecting liquid fuel into the combustion chamber(s) of the engine (1); the system employing a main supply source of liquid alcohol fuel (4) such as methanol as the principal fuel for the engine and an ether pilot fuel having a wider flammability range and lower ignition temperature than the principal alcohol fuel. Prescribed quantities of the ether pilot fuel are arranged to be delivered to the engine (1) during operation for mixing with the principal fuel (4) and ignition of the delivered pilot fuel to raise the temperature of the fuel mixture in the combustion chamber(s) sufficiently to enable full ignition under compression of the principal fuel. The system preferably including an apparatus for producing the ether pilot fuel from a bypass supply (7,8,9) of the principal liquid alcohol fuel (4) by way of a heat exchanger/catalytic convertor device 10; and including a condensation separator (16,18) for removal of at least a part of any readily condensible content of the pilot fuel before delivery to the engine (1) to permit ignition under compression of the delivered pilot fuel.

29 Claims, 4 Drawing Sheets

FIG. 4 he operation of a diesel engine on a alcohol fuel such as methanol a practical and commercially viable proposition. Other and more particular objects and advantages of the present invention will become apparent from the ensuing description.

FUEL SUPPLY AND CONTROL SYSTEM FOR COMPRESSION IGNITION ENGINES

BACKGROUND OF THE INVENTION

1. Field of the Invention

This invention relates to compression ignition engines or what are commonly known as diesel engines, which are conventionally designed to operate by the compression ignition of an appropriate diesel oil fuel; and to the design or conversion of such engines so as to be operable with an alternative fuel either in full substitution of the diesel oil fuel otherwise employed, or at least in the substitution of a major part of such diesel oil fuel, during normal operating conditions of the engine.

These proposals have been made for the employment of gases and liquid alcohol fuels as alternatives for spark ignition internal combustion engines and compression ignition or 'diesel' engines; and while considerable success has been achieved with the employment of gaseous and liquid alcohol fuels as alternative fuels for spark ignition engines, and success to a lesser degree has been achieved with the gas conversion of diesel engines, proposals for operating diesel engines on a liquid alcohol fuel have not achieved the same degree of success. The ability to convert diesel engines to successfully and efficiently operate on an alcohol fuel such as a methanol is affected by the fact that such alcohol fuels do not spontaneously ignite in the combustion chamber of a typical diesel engine. This problem may be overcome by modification of a diesel engine to provide for spark ignition of fuel in a supplementary small combustion chamber connected to a main combustion chamber of a diesel engine; but problems have arisen in the development of this system and the system does involve substantial modifications to the basic engine and associated component design, and the adoption of such a system as a whole is not considered at present to be a viable commercial proposition.

2. Description of the Prior Art

An alternative recently developed system for diesel engines has involved the proposal to employ a pilot fuel such as an ether having a wider inflammability range and lower ignition temperature than the principal alternative alcohol fuel, and this system forms the basis of the present invention.

Reference is made to U.S. Pat. No. 4,422,412 (Norton - assignor to A.E.C.I.Limited) which relates to a device for converting an alcohol to an ether when fitted to a compression ignition engine, the device comprising a heat exchanger having an inlet to receive the alcohol and an outlet in communication with the inlet end of a catalytic conversion chamber which contains a catalyst for conversion of an alcohol to an ether. The conversion chamber has an outlet pipe to lead the ether to a cylinder of a compression ignition engine. Alcohol is fed from a storage tank along lines and direct to the cylinder and also along a line to a heat exchanger.

SUMMARY OF INVENTION

Whilst the theoretical aspects disclosed in the specification of this patent are basically sound, it is considered that the specification and device disclosed does not go far enough in providing a practical solution to effective and efficient operation of a diesel engine on alcohol fuel, and it is an object of the present invention to provide further developments which are believed to render the operation of a diesel engine on a alcohol fuel such as methanol a practical and commercially viable proposition. Other and more particular objects and advantages of the present invention will become apparent from the ensuing description.

According to this invention therefore, there is provided a fuel supply system for an internal combustion engine of the compression ignition kind and having liquid fuel injection means for injecting fuel into each combustion chamber of the engine, said system comprising a supply source of liquid alcohol fuel as the principal fuel, a main fuel supply line from said supply source coupled to the fuel injection means for supply of the principal fuel to the engine, a source of supply of an ether pilot fuel having a wider flammability range and higher cetane number than the principal fuel, and delivery means for delivering prescribed quantities of said pilot fuel to the engine via a condensation extraction means which removes at least part of any readily condensible content of the pilot fuel prior to delivery to the engine and mixing with inlet air in the combustion chamber of the engine, said pilot fuel reacting with air in the combustion chamber to ignite under compression to raise the temperature of the fuel mixture therein and enable initiation and acceleration of ignition under compression of said principal fuel on injection.

Preferably, the system provides that the engine is adapted or designed to operate on up to 100% alcohol fuel, and whilst a separate source of the pilot fuel can be provided it is preferable that the pilot fuel be manufactured by a conversion of a proportion of the principal alcohol fuel. Thus, the system may additionally include a secondary fuel supply line from the main or a further supply source of the principal alcohol fuel coupled to the pilot fuel delivery means for directing a proportion of said principal fuel to a reactor conversion device for at least partial conversion to an ether pilot fuel.

In another aspect of the invention there is provided a method of operating a single or multi-cylinder internal combustion engine of the compression ignition kind and having liquid fuel injection means for injecting fuel into the or each combustion chamber of the engine, comprising the steps of:

a. providing a supply source of a liquid alcohol fuel as the principal fuel for the engine and feeding said principal fuel via a main supply line to said fuel injection means for injection into the engine.

b. bypassing a quantity of the liquid alcohol fuel to a reactor conversion device for the production of an ether pilot fuel having a wider flammability range and higher cetane number than the principal fuel c. subjecting the ether pilot fuel to a condensation process for the removal of at least a part of any readily condensible content from the ether pilot fuel, and delivering prescribed quantities of said at least partly separated ether fuel to the engine combustion chamber(s) for ignition under pressure on the compression stroke of the engine and prior to injection of the liquid alcohol principal fuel, to enable initiation and acceleration of combustion of said principal fuel during at least initial starting and/or low load operating phases of the engine.

In a further aspect there is provided a method operating a single or multi-cylinder internal combustion engine of the compression ignition kind and having a liquid fuel injection means for injecting fuel into the or each combustion chamber, comprising the steps of:

a. providing a supply source of a liquid alcohol fuel as the principal fuel for the engine and feeding said principal fuel via a main supply line to said fuel injection means for injection into the engine b. bypassing a quantity of the liquid alcohol fuel to vapourizing and reactor conversion means for the production of alcohol fuel vapor and ether pilot fuel, said ether pilot fuel having a wider flammability range and higher cetane number than the principal fuel c. subjecting the ether pilot fuel and alcohol fuel vapor to a condensation process for the removal of at least a part of any readily condensible content from the ether pilot fuel and alcohol fuel vapor, and delivering prescribed quantities of the ether pilot fuel and alcohol fuel vapor to the engine combustion chamber(s) for ignition under pressure on the compression stroke of the engine and prior to injection of the liquid alcohol principal fuel, to enable initiation and acceleration of combustion of said principal fuel during at least initial starting and/or low load operating phases of the engine and to provide additional energy to the engine in addition to the said principal fuel under other load operating phases.

DRAWINGS

Some preferred aspects of the invention will now be described by way of example and with reference to the accompanying drawings, in which.

DESCRIPTION OF PREFERRED EMBODIMENTS

Figure 1:
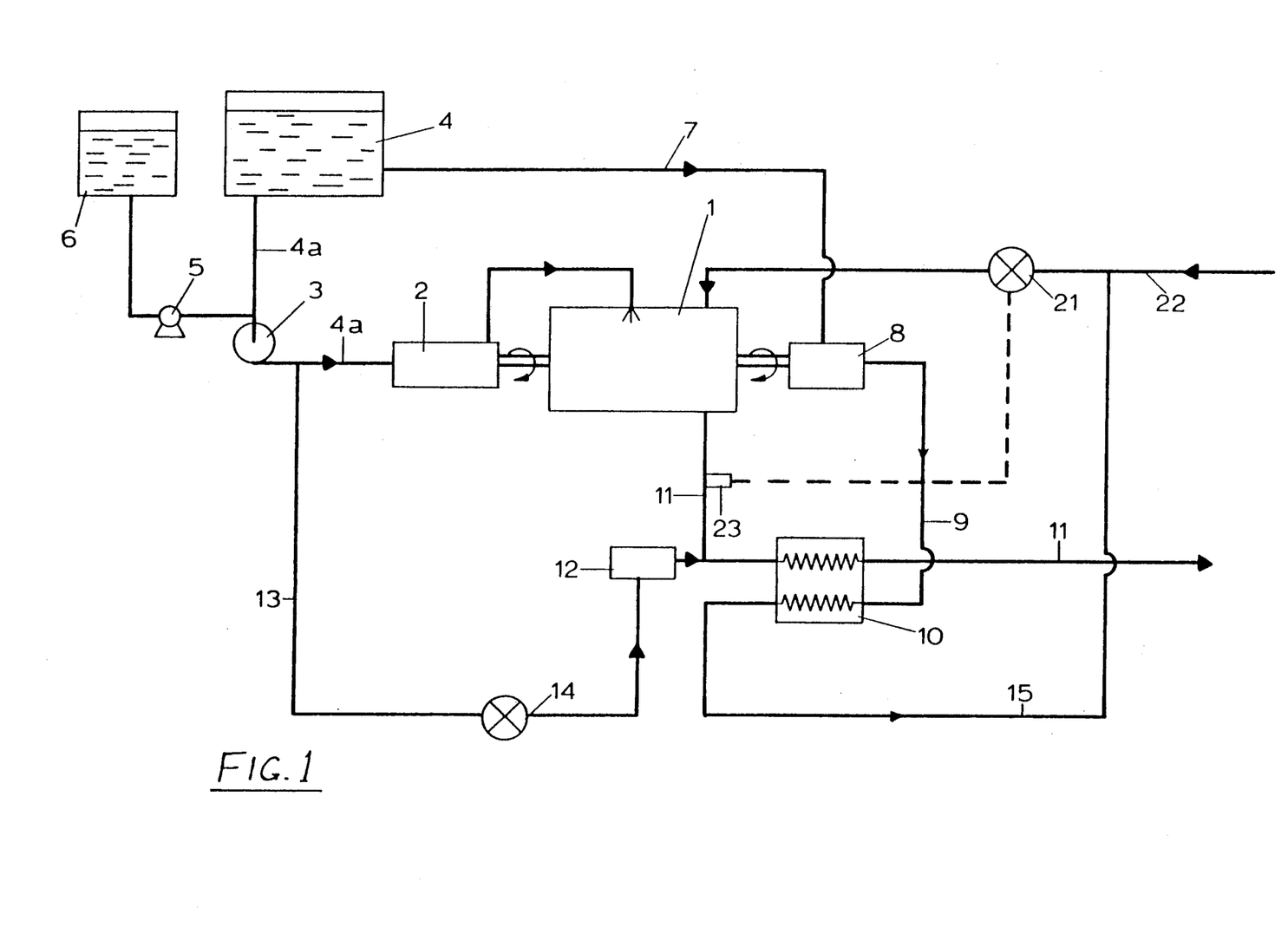
FIG. 1 is a schematic diagram illustrating a first fuel supply system in accordance with the invention

Referring firstly to FIG. 1 of the drawings, the invention is particularly applicable to a typical compression engine or diesel engine 1 of the single or multi-cylinder kind with a reciprocating piston for each cylinder; with an injector pump 2 driven directly or indirectly by the engine 1 for the delivery of prescribed quantities of operating fuel to the respective combustion chamber(s) defined by the cylinder(s) and piston(s). In a typical diesel engine, the normally provided injector pump 2 is directly connected via a variable speed fuel delivery pump 3 to the diesel fuel oil supply tank and is readily capable of handling the fuel flow requirement, whereas with the employment of an alcohol such as methanol (of lower calorific value and lower cetane number than diesel fuel) as the principal fuel, considerably greater injection pump capacity must be provided to cope with such requirement. Having regard for the nature of an alcohol such as methanol, it is also preferably desirable to provide supplementary lubrication for the injector pump (lubrication in the normal course of events being provided by the diesel fuel); and thus lubricating oil may be injected into the system by means of a suitable metering pump 5 (electrically or engine driven) pumping prescribed quantities of oil from an oil supply source or tank 6 to the input side of the methanol delivery pump 3 for mixing with the methanol delivered to the injector pump 2 from the supply tank 4.

As previously indicated, while a separate source of pilot ether fuel can be provided for supply to the engine 1, preferably the main source of the methanol or other principal alcohol fuel is provided with a secondary or bypass fuel line 7 which passes a quantity of the methanol to a controllable pilot fuel pump 8 (which can be electrically driven or driven directly or indirectly mechanically by the engine 1, e.g. by any direct or indirect coupling means) such that the rate of operation of the pilot fuel pump 8, and thus the quantity of fuel pumped thereby, is controlled and made to vary with the rate of delivery of the injected fuel and/or with the engine speed. The outlet line 9 from the pilot fuel pump 8 is directed to a reactor or converter device 10 in the form of a heated or heat exchanger device having a catalytic conversion chamber containing a catalyst for conversion of methanol fed thereto by way of the outlet line 9 to an ether fuel having a greater or wider inflammability range than the incoming methanol fuel. Preferably, the methanol fuel is converted to a dimethylether (DME) which may be readily mixed with the inlet air for the engine 1 to ignite under compression and initiate combustion of the methanol injected in the diesel engine 1. Methanol can be readily converted to DME at moderate temperatures over a suitable dehydration catalyst, and the conversion device disclosed in the aforementioned U.S. Pat. No. 4,422,412 or any other suitable reactor, conversion device or ether generator, can be employed. It is preferable that the heat exchanger catalytic converter 10 need not require excessively high temperatures to operate, as one preferred means of providing the heat for the heat exchanger is by way of utilization of the exhaust outlet system or line 11 for the engine, the reactor or ether generator (heat exchanger catalytic converter) 10 being arranged to be directly coupled to the exhaust line 11; and a study has found that an inexpensive alumina catalyst can achieve good conversion rates of methanol to DME at temperatures as low a 250° to 300° C. Heat and mass transfer calculations indicate that only a small part of the heat energy available in the diesel engines exhaust system 11 is required to power a continuous DME reactor.

The reactor or ether generator 10 can alternatively be separate from the exhaust and be electrically heated, but the existing exhaust system 11 of the engine 1 provides a convenient source of otherwise wasted heat and obviates the continuing electric power draw-off of a reactor or generator converter heated and operated solely by electricity.

It will be appreciated of course that there will be no available exhaust heat for operation of the reactor or converter 10 when coupled to the exhaust system 11 when the engine 1 is started from cold; and there are optional cold starting systems involving, for example:

(a) Maintaining a supply of diesel fuel for the engine 1 and using such supply for start up in the usual manner passing the diesel oil fuel to the engine 1 by way of the injector pump 2; followed by a switching over to methanol operation and operation of the reactor converter 10 for supplementary supply of ether or DME pilot fuel to the engine 1 when the exhaust system 11 has reached the desired temperature for effective operation of the reactor converter 10.

(b) A separate supply of preformed ether or DME can be provided for initial mixing with the engine inlet air, followed by a switching over to the methanol supply line 7 to the pilot fuel pump 8 and reactor converter 10 again once the exhaust system 11 has reached the desired temperature sufficient to operate the reactor converter 10.

(c) The reactor converter 10 can be provided with a supplementary electrical heating element for initial warm-up and operation for conversion of the methanol to ether or DME, with the exhaust system 11 taking over the heating and conversion operation again on reaching the desired temperature. This system is however not favored (except perhaps in the case of a stationary engine and the ability to employ mains electric power), as in the case of a motor vehicle there would be an undesirable electric power draw-off from the battery prior to starting; and also a time delay in starting of the engine 1.

Figure 2:
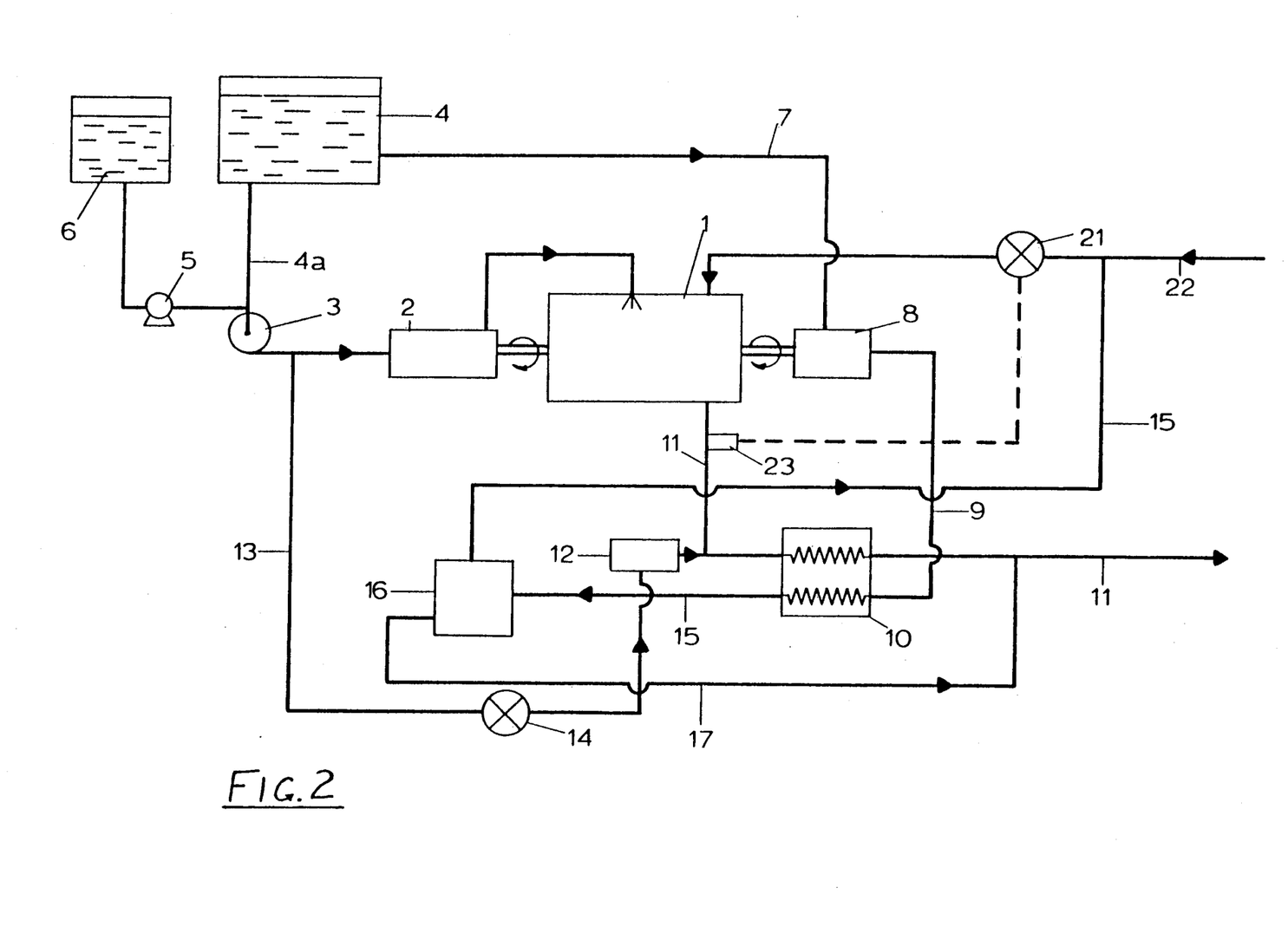
FIG. 2 is a similar schematic diagrammatic view illustrating a modification of the invention.
Figure 3:
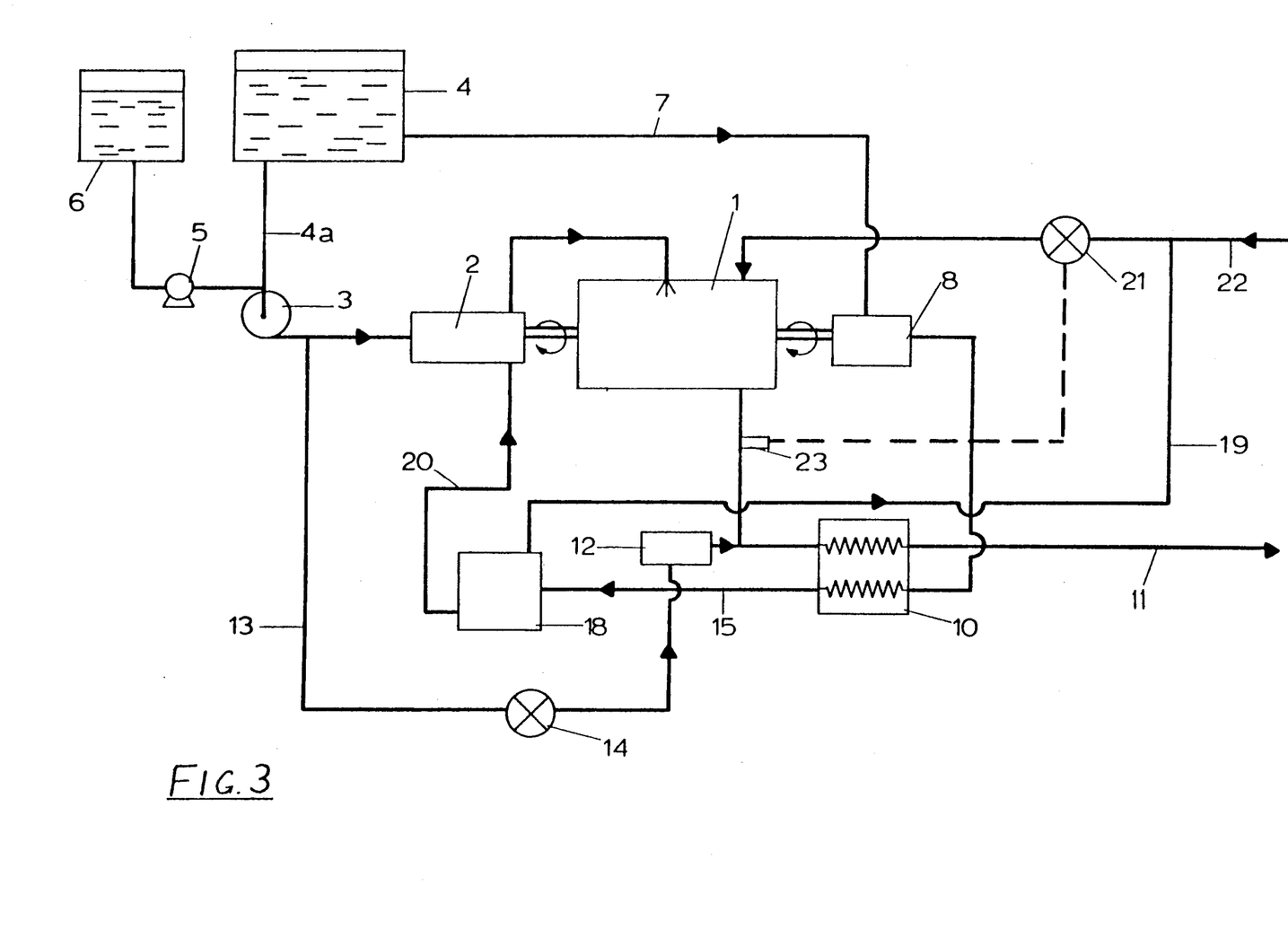
FIG. 3 is a further similar schematic diagrammatic view illustrating a further modification or variation of the invention.

(d) Alternatively and as illustrated in FIGS. 1 to 3, a methanol burner device 12 can be employed, fed by a suitable methanol bypass line 13 from the main feed line 4a from the methanol supply source and by way of a cold start solenoid valve 14. The burner 12 being coupled to or associated with the exhaust system 11 at or adjacent the reactor converter 10 so as to provide initial high temperatures to the exhaust 11, and thus reactor converter 10, for operation as required in providing the ether or DME in operation of the engine 1. The burner device 12 may burn other fuels.

In the process of supply of the bypassed quantity of methanol or liquid alcohol fuel to the reactor converter device 10, and the conversion of some of that bypassed fuel to the ether or DME pilot fuel, the heat exchanger will create water and methanol vapor (or other liquid alcohol fuel vapor containing the ether or DME pilot fuel; and FIG. 1 illustrates a direct line 15 for passage of vapourized methanol and diethyl or dimethyl ether from the reactor converter 10 to the inlet air system or manifold of the engine 1. However, for more effective and efficient operation it is preferred that at least a part of any condensate or readily condensible content of the vapor is removed from the pilot fuel prior to passing into the engine 1, to enable rapid reaction during compression with the air in the respective combustion chamber, and raising the temperature of the injected methanol sufficiently to ignite under compression. Accordingly, and with reference now to FIG. 2 of the drawings, in one arrangement a liquid separator unit 16 is interposed in the output line 15 from the reactor converter 10 to separate out at least a part of the suspended liquid and readily condensible content from the DME vapour supplied to the engine 1. The separator 16 can be of various kinds and may simply provide for membrane filtration, or alternatively provide for fractional distillation, dessication or centrifugal separation. The liquid and condensate separated out thereby can be discharged by way of a bypass line 17 into the engine exhaust system 11 at the outlet or downstream side of the reactor converter 10, and thus provide an added advantage in assisting cooling of the exhaust system 11 at the outlet side without affecting the heat required for operation of the heat exchanger forming part of the reactor converter 10. Alternatively, the extracted water and condensate (which may contain some methanol or alcohol fuel content) can be directed to a separate storage tank for possible further treatment;

In operation of the reactor converter 10, not all of the methanol directed thereto by way of the pilot fuel pump 8 will at all times be converted to the preferred dimethyl ether pilot fuel or a readily combustible (under compression) DME, methanol and water, vapor mix; and as a preferred alternative to the separator 16 arrangement mentioned with reference to FIG. 2 of the drawings, as shown in FIG. 3 of the drawings, a condenser 18 is employed in place of the water separator 16 and arranged to be operable so as to provide direct or partly direct DME gas or vapor mix to the engine 1 by way of a first line 19, and any excess unconverted liquid methanol and extracted condensate can be directed via a second line 20 to the injector pump 2 for mixing with the principal methanol alcohol fuel to be injected thereby to the engine cylinder combustion chamber(s).

Normally, the employment of an alternative fuel supply system and apparatus for operation of diesel engines on a liquid alcohol fuel such as methanol will in many instances involve the requirement of making some modification to or adjustment of the fuel injector pump, or to provide an alternative specially designed injector pump, so as to be capable of accommodating the larger volume (when compared with the volume of diesel oil fuel providing the same power output - methanol having in the region of about half the calorific value of diesel oil fuel) of methanol or other liquid alcohol fuel to be employed as the principal fuel. The degree of charge will of course be dependent upon the nature and required operations of the engine concerned, and minimal change to the fuel injection pump may be in order where optimum performance of the engine is of no real concern. For example, in a stationary engine set-up with the engine arranged to normally operate at a substantially constant speed or within a substantially constant or limited speed range, a simple increase in the standard injector pump 2 maximum rack opening position is likely to be sufficient compensation for the reduced calorific value of methanol when compared with diesel oil; but for higher speeds a more complete retuning of the injection system may be required.

However, in most cases optimum engine performance is desirable (sometimes even essential), and another object of the present invention is to enable the fuel supply system and apparatus described and illustrated to be adapted and employed in a manner enabling optimum, or near optimum, performance of an engine under all (or at least a wide range of) operational phases without the requirement for costly fuel injection pump modification or construction. The following involve further preferred applications of the invention.

As previously mentioned the excess or liquid methanol and/or condensate extracted by the condenser 18 can be introduced to the liquid methanol principal fuel line for direct injection therewith to the engine 1. The latter method of disposing of and usefully using the methanol or alcohol vapor has been found to be advantageous to engine efficiency. As a development of this aspect it has been found that, if, instead of passing all of the methanol or alcohol fuel vapor (after condensation) to the engine 1 by way of the liquid fuel injectors 2, a controlled proportion of the methanol or alcohol fuel vapor be directed with the appropriate proportion of dimethyl ether into the inlet air for the engine 1, it can be more advantageously employed to supplement the energy input of the principal liquid fuel. In this case the dimethyl ether vapor combined with the methanol or alcohol vapour initiate and accelerate the combustion of the principal liquid fuel through their prior ignition and combustion in addition to supplementing the energy input.

While it is envisaged that the ether pilot fuel and desired additional fuel vapor can be separately produced and delivered to the inlet air line for the engine, as the ether pilot fuel is derived by conversion from the vaporized fuel it is more convenient and economical to utilize the same reactor converter device 10 (which will operate at between 250° C. to 400° C. usually at about 300° C. and control the proportion of ether pilot fuel formed relative to the remaining vapor; so that ether pilot fuel and methanol (or other alcohol) vapor mix can be delivered as one by way of the ether/DME pilot fuel line 15) for mixing and combustion with the inlet air in assisting rapid and efficient combustion of the injected liquid methanol or alcohol principal fuel, and reducing the actual quantity of principal fuel required to be injected for optimum engine performance. This method and reduction in quantity of principal fuel to be injected enables efficient engine operation without the need for expensive change or modification of existing diesel fuel injection pumps, or the provision of a custom designed methanol or alcohol liquid fuel injection pump.

A convenient method of removing water from the pilot ether or DME fuel produced by the reactor converter device 10 without removing or causing unnecessary condensation of the methanol or alcohol vapor, is by employment of the condenser 18 as described with reference to FIG. 3 of the drawings, and controlling the condenser temperature and pressure within appropriate prescribed limits - as methanol (or other alcohol) and water have different condensation characteristics, the desired water separation from the ether/DME pilot fuel and the provision of controlled quantities of methanol or alcohol vapour is readily achievable by appropriate temperature/pressure control. Other methods of achieving the same separation of water from the ether/DME pilot fuel and methanol/ alcohol vapor can be employed, e.g., as described with reference to FIG. 2 of the drawings, the separator 16 can employ absorbtion filtration techniques.

The optimum proportion of methanol/alcohol fuel vapor relative to the ether/DME pilot fuel in the pilot stream or line 15, and as delivered to the inlet air side of the engine 1, can be simply controlled by setting the mass of catalyst in the reactor converter device 10, as required together with adjustment to condensation conditions in condenser 18 - as the mass of the reactor catalyst is reduced for any given flow rate of incoming liquid methanol/alcohol fuel delivered by way of the bypass line 7 and delivery pump 8, so the proportion of unreacted methanol/alcohol to ether/DME pilot fuel in the outlet stream or line 15, 19 is increased. In a typical arrangement, an input of one kilogram of methanol to the reactor converter device 10 operating at about 300 degrees centigrade will produce a pilot fuel vapor in the approximate proportions of 0.3 kilograms of Methanol, 0.2 kilograms of water and 0.5 kilograms of DME - this vapor can be cooled by the condenser 18 to about 20°-60° C. centigrade for extraction of the readily condensible water and methanol content of the vapor.

The methods of operation of a compression ignition engine in accordance with the present invention, and employment of the system and apparatus described, are particularly applicable for smooth and efficient operation under such as low load and/or speed phases (and/or during warm up stages), as well as for generally obtaining optimum performance from the engine; but it will be appreciated that with a hot engine and high speed operations, the principal liquid methanol or other alcohol fuel may be readily combustible and at least reasonably efficiently employed without the need for initiated and accelerated combustion by prior introduction of the ether/DME pilot fuel, by itself or in combination with the unconverted methanol/alcohol vapor. Smooth and efficient operation of a compression ignition engine throughout all stages or phases of operation is, however, not readily attainable utilizing only liquid methanol or other alcohol fuel as the principal fuel; and the present invention overcomes this problem and additionally avoids the need for special high capacity fuel injection pump provision or changes.

In providing a self contained system providing for 'cold starting' of an engine, it is preferred to employ the previously referred to system or method (b) of providing a separate supply of preformed ether or DME pilot fuel for initial mixing with the inlet air prior to switching over to the system providing for production of the pilot fuel from the bypassed methanol or other alcohol fuel for ongoing operation. Another development of the invention comprises the addition to the previously disclosed apparatus of a pilot fuel storage vessel and a pressure control valve in the pilot fuel delivery lines 15 and 19 from the reactor converter 10 to the water separator 16 or condenser 18; to enable collection and storage of a quantity of the ether/DME pilot fuel produced during operation of the engine and alternative fuel conversion system, for use in subsequent starting or restarting operations (particularly when no exhaust heat is available for the reactor converter 10).

Figure 4:
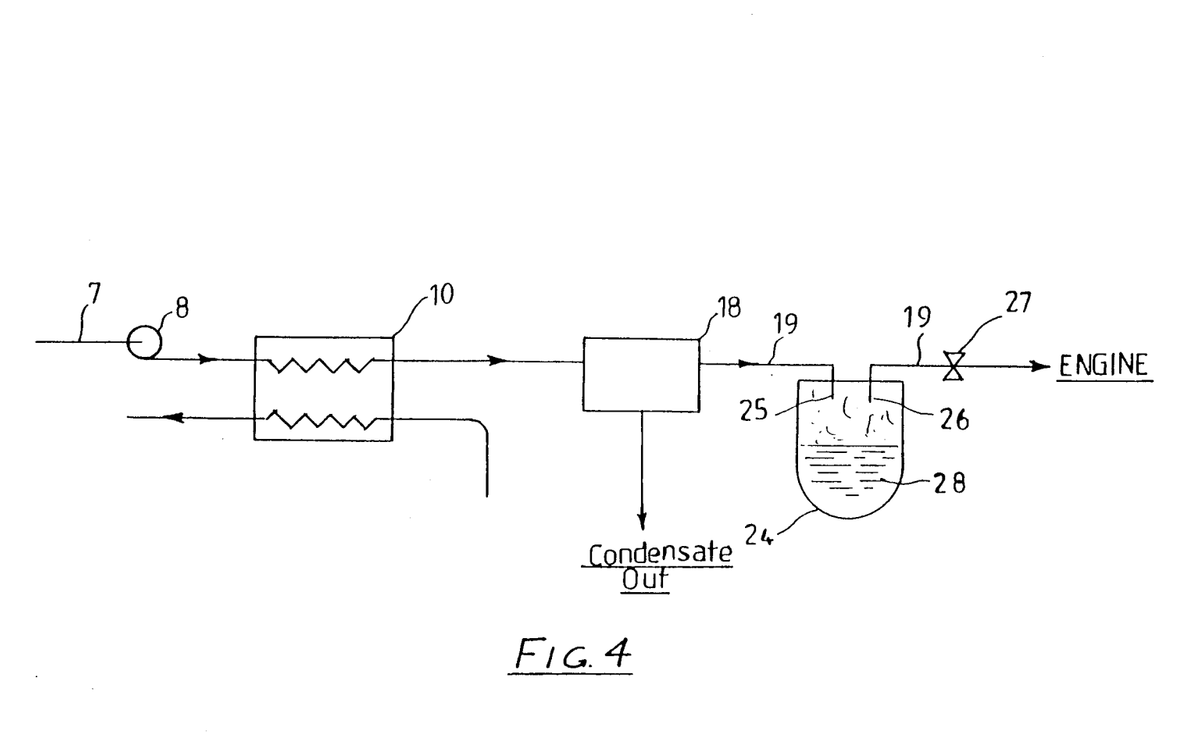
FIG. 4 is a further schematic diagrammatic view illustrating a modification of the pilot fuel supply means.

The accompanying drawing in FIG. 4 diagrammatically illustrates one form of this further pilot fuel supply development. The pilot fuel bypass pump 8 delivers liquid methanol or other alcohol fuel to the reactor converter 10, which is heated as before by any suitable means (e.g. by a burner 12 or by exhaust heat) to the desired temperature range of between 250° C. and 400° C. for the production of methanol/ alcohol fuel vapor, and at least partial conversion to ether or DME, for delivery on to a cooler or condenser 18; which is set to operate at the desired pressure and/or temperature required to allow condensation and separation out of at least part of the condensible portion of the fuel vapor (within which the ether/DME pilot fuel is embodied). The extracted condensate may be variable according to requirements and operating conditions and/or the kind of engine involved, and could involve a small part or a major part of the condensate content of the vapor passed to the condenser 18.

The separated or partly separated vapor fuel is then passed by way of delivery line 19 to a substantially sealed pressure vessel 24 through upper inlet and outlet connections 25, 26, and on through a pressure control valve 27 to the engine for mixing with the inlet air for combustion during operation as previously described. The pressure control valve is set above the vapor pressure of the cooled ether or DME pilot fuel and methanol (or other alcohol) and at a level allowing pilot fuel and vapor delivery to the engine as required. The vessel 24 is thus pressurized so that ether/DME pilot fuel and vapour delivered thereto from the cooler/condenser 18 will condense to liquid 28 within the vessel 24, and at least some can be stored for subsequent use in starting or restarting the engine after stopping. The ether/DME pilot fuel can be bled off through the outlet connection 26 as required by the engine by lowering the set-point of the pressure control valve 27 to below the vapor pressure of the stored liquid pilot fuel 28, and allowing such liquid pilot fuel 28 (retained in the liquid state under pressure) to flash off back to a vapor.

Mixing of the pilot fuel in the inlet air system of the engine 1 can be simply by way of a spud type gas mixer coupled to the engines inlet duct.

For further efficiency in operation, over wide ranges of engine speeds and loads, it may be desirable to provide for regulation and boosting of the engine combustion chamber temperatures to specific ranges above those normally maintained for operation of the engine 1 using diesel fuel as the principal fuel, to further assist and stabilize the ignition and combustion of the methanol with a minimum supplement of the ether pilot fuel. This will be particularly applicable following initial starting up and when operating under light load conditions and/or low engine speeds, when the temperatures within the combustion chamber(s) may not reach the desired range necessary to enable effective or efficient burning of the methanol fuel. Accordingly, boosting of gas temperatures inside the combustion chamber(s) can be effectively obtained by providing an inlet air throttling valve 21 in the inlet air line or duct 22 to regulate the volume of air (and thus its cooling effect) fed to the engine; and/or an exhaust gas throttle valve can be provided in the engine gas exhaust system (provided in addition or as an alternative to the inlet air throttling valve 21) to enable raising and regulation of exhaust gas temperatures sufficiently high to maintain operation of the pilot fuel generator or converter 10. The inlet throttling valve 21 is preferably arranged to be automatically regulated, e.g. by an electric servo, bimetal control or other temperature sensitive means controllable directly or indirectly by way of a temperature sensor device 23 coupled to the engines exhaust system 11 in close proximity to the engines exhaust valves and manifold assembly. Any similar or other suitable means can be provided for control of an exhaust throttle valve when fitted.

Further modifications for most effective operation under a wide range of engine speeds and loads, as may be required in particular in vehicle operation, can include the installation of further cylinder head and oil temperature control devices, and a methanol or other alcohol fuel recirculation system to prevent vapor lock in the injection pump 2. In more sophisticated engine systems electronics can be employed for the close control of principal alcohol fuel and/or pilot fuel, whereby such supply is subject to control according to engine loading and/or speed; but generally speaking the provision of the basic equipment comprising the controlled pilot fuel pump 8 for determining substantially precise pilot fuel requirements fed to the reactor converter 10 and engine 1, the catalyst or ether generator 10 and the provision of a condensate separator 16 or condenser 18 and means for controlling the supply of drier or dry DME and fuel vapor to the engine 1 in prescribed quantities with the inlet air, will enable employment of the normally provided engine and associated components without major modifications and with sufficient efficiency to enable employment of up to 100% methanol as the main operation fuel and without the need to provide a separate main supply for diesel fuel. The provision for inlet air and/or exhaust gas throttling involves no major change to existing inlet and exhaust systems and is thus a desirably incorporated feature facilitating effective operation under light loads by maintaining gas exhaust temperatures above 250° C.

In the basic forms of the invention and under cold start and initial warm up conditions, up to 60% (in energy value) pilot ether fuel may be necessary for operation of the engine; but during normal optimum operating conditions, and with the preferred aspects of the invention the proportion (in energy value) of the pilot fuel required may be as low as 1%.

It will thus be seen that the present invention can be readily applied to existing vehicles or machinery (stationary or moving) employing compression ignition engines normally designed to operate on diesel fuel, with standard "kit-set" componentry; and/or new vehicles and machinery employing compression engines for operation on methanol as described can be provided with relatively little additional costs, and with viable monetary savings and gains in operating costs with the generally lower costs of methanol and other alcohol fuels - without loss in efficiency in operation and with the further added advantages of methanol or other alcohol fuel employment involving clean burning with less air pollution, and also longer engine life under most operating additions, when compared with conventional diesel oil use.

The foregoing description has been primarily directed to the employment of methanol as the principal liquid alcohol fuel, and it will be appreciated that any of the components of the described system referred to as involving or using methanol will be similarly arranged (with or without modification as may be appropriate) to involve or use any other similar and suitable alcohol fuel alternatively employed as the principal alcohol fuel.

Some preferred aspects of the invention have been described by way of example and with reference to the accompanying drawings, but other variations of and modifications to the invention can take place without departing from the scope of the appended claims.

I claim:

1. A fuel supply system for an internal combustion engine of the compression ignition kind and having liquid fuel injection means for injecting fuel into each combustion chamber of the engine, said system comprising a supply source of liquid alcohol fuel as the principal fuel a main fuel supply line from said supply source coupled to the fuel injection means for supply of the principal fuel to the engine, a source of supply of an ether pilot fuel having a wider flammability range and higher cetane number than the principal fuel, and delivery means for delivering prescribed quantities of said pilot fuel to the engine via a condensation extraction means which removes at least part of any readily condensible content of the pilot fuel prior to delivery to the engine and mixing with inlet air in the combustion chamber of the engine, said pilot fuel reacting with air in the combustion chamber to ignite under compression to raise the temperature of the fuel mixture therein and enable initiation and acceleration of ignition under compression of said principal fuel on injection.

2. Apparatus for the operation of an internal combustion engine of the compression ignition kind utilizing a liquid alcohol fuel as the principal fuel for the engine, said engine having at least one cylinder housing a reciprocally movable piston and defining a combustion chamber; said apparatus comprising:

first delivery means arranged to be coupled to a supply source of liquid alcohol fuel and to deliver prescribed quantities thereof to fuel injection means for the engine, reactor conversion means for converting liquid alcohol fuel to an ether coupled to a second delivery means which is arranged to receive some of the principal liquid alcohol fuel and deliver metered prescribed quantities of the principal fuel to said reactor conversion means for conversion to a pilot ether fuel, condensation extraction means coupled to and arranged to receive either pilot fuel from said reactor conversion means and to remove at least a major part of the condensable content from said ether pilot fuel prior to delivery by said second delivery means of prescribed quantities of the pilot fuel to the engine combustion chamber simultaneously with the admission of air to said combustion chamber and prior to injection by said fuel injection means of prescribed quantities of the principal alcohol fuel.

3. Apparatus as claimed in claim 2, wherein said pilot fuel delivery means comprises an electrically driven fuel pump the rate of operation of which is controlled and made to vary with the rate of delivery and injection of the principal alcohol fuel.

4. Apparatus as claimed in claim 2, wherein said pilot fuel delivery means comprises a fuel pump which is arranged to be driven by the engine such that the rate of operation of the pilot fuel pump is controlled and made to vary with the rate of delivery and injection of the principal alcohol fuel.

5. Apparatus as claimed in claim 2, wherein the engine has an exhaust outlet system and wherein said reactor conversion means is coupled to and arranged to be heated by the exhaust outlet system of the engine, and wherein an alcohol fuel burner device is positioned relative to the engine exhaust outlet system in proximity to said reactor conversion means and arranged on operation to provide initial high temperatures to the exhaust system and reactor conversion means for cold starting of the engine and production of the pilot fuel.

6. Apparatus as claimed in claim 2, wherein the liquid fuel injection means comprises an injector pump and said first delivery means comprises a delivery pump for delivering the principal alcohol to said injector pump, and a supplementary oil metering pump is provided for delivering prescribed quantities of lubricating oil to the input side of said injector pump.

7. Apparatus as claimed in claim 2, wherein said condensation extraction means is a separator unit interposed in an output line from the reactor conversion means.

8. Apparatus as claimed in claim 7, wherein said separator unit includes membrane filtration means for the separation of at least a major part of any condensation in the pilot fuel delivered to the engine.

9. Apparatus as claimed in claim 7 wherein said separator unit includes fractional distillation means for the separation of at least a major part of any condensation in the pilot fuel delivered to the engine.

10. Apparatus as claimed in claim 7, wherein said separator unit provides for centrifugal separation of at least a major part of any condensation content in the pilot fuel delivered to the engine.

11. Apparatus as claimed in claim 7, wherein the engine has an exhaust system and wherein condensate separated out from the pilot fuel by said separator unit is arranged to be discharged by way of a bypass line into the exhaust system of the engine.

12. Apparatus as claimed in claim 2, wherein condensate separated out from the pilot fuel by the separator unit is arranged to be discharged into the engine exhaust system at the outlet or downstream side of the reactor conversion device.

13. Apparatus as claimed in claim 2, wherein said condensation extraction means comprises a condenser which receives partially converted fuel from the reactor conversion means and provides dry ether pilot fuel to the engine by way of a first feed line, excess unconverted fuel from the reactor conversion device and condensate extracted from the ether pilot fuel being arranged to be directed by way of a second line to the principal alcohol fuel injection means for mixing with the principal alcohol fuel to be injected thereby into the engine combustion chamber.

14. Apparatus as claimed in claim 2, wherein an inlet air throttling valve is provided for one of an inlet air line or duct of the engine to regulate the volume of air fed to the engine and enable control of the cooling effect of the inlet air for control and adjustment of gas temperatures within the combustion chamber of the engine, operation of said inlet air throttling valve being effected by temperature sensitive actuating means controllable by a temperature sensor device coupled to an exhaust gas outlet part of the engine.

15. Apparatus as claimed in claim 2, wherein an exhaust gas throttle valve is provided for an exhaust outlet system of the engine to enable raising and regulation of the exhaust gas temperature for effective operation of said pilot fuel reactor conversion means; operation of said exhaust gas throttle valve being effected by temperature sensitive actuating means controllable by a temperature sensor device coupled to said exhaust system.

16. Apparatus as claimed in claim 2, wherein said pilot fuel delivery means comprises an electrically driven fuel pump the rate of operation of which is controlled and made to vary with the engine speed.

17. Apparatus as claimed in claim 2, wherein said pilot fuel delivery means comprises a fuel pump which is driven by the engine such that the rate of operation of the pilot fuel pump is controlled and made to vary with the engine speed.

18. A method of operating an internal combustion engine of the compression ignition kind and having liquid fuel injection means for injecting fuel into the engine, said engine having at least one cylinder housing a reciprocally movable piston and defining a combustion chamber, said method comprising the steps of:

a. providing a supply source of a liquid alcohol fuel as the principal fuel for the engine and feeding said principal fuel via a main supply line to said fuel injection means for injection into the engine;

b. bypassing a quantity of the liquid alcohol fuel to a reactor conversion means for the production of an ether pilot fuel having a wider flammability range and higher cetane number than the principal fuel;

c. subjecting the ether pilot fuel to a condensation process for the removal of at least a part of any readily condensible content from the ether pilot fuel and delivering prescribed quantities of said at least partly separated ether fuel to the engine combustion chamber for ignition under pressure on the compression stroke of the engine and prior to injection of the liquid alcohol principal fuel, to enable initiation and acceleration of combustion of said principal fuel during at least initial starting and low load operating phases of the engine.

19. A method of operating an internal combustion engine of the compression ignition kind and having a liquid fuel injection means for injecting fuel into the combustion chamber, said engine having at least one cylinder housing a reciprocally movable piston and defining a combustion chamber, said method comprising the steps of:

a. providing a supply source of a liquid alcohol fuel as the principal fuel for the engine and feeding said principal fuel via a main supply line to said fuel injection means for injection into the engine;

b. bypassing a quantity of the liquid alcohol fuel to vaporizing and reactor conversion means for the production of alcohol fuel vapor and ether pilot fuel, said ether pilot fuel having a wider flammability range and higher cetane number than the principal fuel;

c. subjecting the ether pilot fuel and alcohol fuel vapor to a condensation process for the removal of at least a part of any readily condensible content from the ether pilot fuel and alcohol fuel vapor and delivering prescribed quantities of the ether pilot fuel and alcohol fuel vapor to the engine combustion chambers for ignition under pressure on the compression stroke of the engine and prior to injection of the liquid alcohol principal fuel, to enable initiation and acceleration of combustion of said principal fuel during at least initial starting low load operating phases of the engine and to provide additional energy to the engine in addition to the said principal fuel under other load operating phases.

20. A method as claimed in claim 19 wherein the vaporizing and reactor conversion means is a reactor conversion device for producing a common mix supply o the pilot ether fuel and alcohol fuel vapor.

21. A method as claimed in claim 18 or claim 19, wherein the reactor conversion means is a heat exchanger device having a catalytic conversion chamber containing a catalyst for the conversion of some of the bypassed liquid alcohol fuel to an ether fuel; the mass of catalyst within the reactor conversion device, and operating temperature thereof, being set and controlled to determine the prescribed proportions of ether fuel and alcohol fuel vapor required to be delivered to the engine.

22. A method as claimed in claim 19, which comprises delivering the alcohol fuel vapor with the ether pilot fuel to a condensation and extraction means which is controlled as to the operating temperature and pressure such that the extraction process is effective for removal of at least a part of any readily condensible content of the ether pilot fuel and alcohol fuel vapor, and wherein the condensate is injected into the principal alcohol fuel supply line.

23. A method of operating an internal combustion engine of the compression ignition kind, as claimed in claims 18 or 19 and including the step of producing an excess in terms of engine requirements of the ether pilot fuel and storing at least some of said excess pilot fuel in a pressure vessel for release and supply to the engine on demand during operation and for use in starting and restarting after stopping of the engine.

24. A fuel supply system for an internal combustion engine of the compression ignition kind and having liquid fuel injection means for injecting fuel into each combustion chamber of the engine, said engine having at least one cylinder housing a reciprocally movable piston and defining a combustion chamber, said system comprising:

a supply source of liquid alcohol fuel as the principal fuel, a main supply line from said supply source coupled to the fuel injection means for supply of the principal fuel to the engine, a secondary or bypass fuel supply line from said supply source coupled to a pilot fuel delivery means and a reactor conversion means which is arranged to at least partially convert some of said principal alcohol fuel to an ether pilot fuel having a wider flammability range and higher cetane number than the principal fuel, said delivery means being arranged to deliver prescribed quantities of said pilot fuel to the engine with inlet air and via said reactor conversion means, and a condensation extraction device which removes at least a part of any readily condensible content of the pilot fuel prior to delivery to the engine and mixing with the inlet air in the combustion chamber of the engine, said pilot fuel reacting with air under compression to ignite and raise the temperature of the fuel mixture therein and initiate and accelerate ignition under compression of said principal fuel on injection.

25. A fuel supply system as claimed in claim 24, wherein said reactor converter device is arranged to produce an ether pilot fuel and alcohol vapor mix for delivery with the inlet air to the engine combustion chamber and ignition under compression prior to ignition of the injected principal fuel.

26. Apparatus for the operation of an internal combustion engine of the compression ignition kind utilizing a liquid alcohol fuel as the principal fuel for the engine, said engine housing at least one cylinder housing a reciprocally movable position and defining a combustion chamber; said apparatus comprising:

first delivery means coupled to a supply source of liquid alcohol fuel for delivering prescribed quantities thereof to fuel injection means for the engine, reactor conversion means for converting liquid alcohol fuel to an ether coupled to a second delivery means which is arranged to receive some of the principal liquid alcohol fuel and deliver metered prescribed quantities of the principal fuel to said reactor conversion means for conversion to a pilot ether fuel, condensation extraction means coupled to and arranged to receive ether pilot fuel from said reactor conversion means and to remove at least a part of the readily condensible content from said ether pilot fuel prior to delivery by said delivery means of prescribed quantities of the pilot fuel to the engine combustion chamber with the admission of air and prior to injection by said fuel injection means of prescribed quantities of the principal alcohol fuel to said combustion chamber.

27. Apparatus as claimed in claim 26, wherein said reactor converter means includes means for producing an ether pilot fuel and alcohol vapor mix for delivery with the inlet air to the engine combustion chamber and ignition under compression prior to ignition of the injected principal fuel.

28. Apparatus as claimed in claims 26 or 27, which comprises a pressure storage vessel and pressure control valve located in the pilot fuel delivery line between said condensation extraction means and the engine for the produced pilot fuel to be passed therethrough, the pressure control valve being actuable to control delivery pressure of said pilot fuel or pilot fuel and alcohol vapor mix to the engine and cause liquification of said pilot fuel or pilot fuel and alcohol vapor mix for storage under pressure within said storage vessel and release in vapor form as required.

29. Apparatus as claimed in claim 26, wherein the engine has an exhaust outlet system and said reactor conversion means is coupled to and arranged to be heated by the exhaust outlet system, and wherein an alcohol fuel burner device is positioned relative to the engine exhaust outlet system in proximity to said reactor conversion means and is arranged on operation to provide initial high temperatures to the exhaust system and reactor conversion means for cold starting of the engine and production of the pilot fuel.

* * * * *